(12) United States Patent
Olien et al.

(10) Patent No.: US 8,441,433 B2
(45) Date of Patent: May 14, 2013

(54) SYSTEMS AND METHODS FOR PROVIDING FRICTION IN A HAPTIC FEEDBACK DEVICE

(75) Inventors: Neil T. Olien, Montreal (CA); George V. Anastas, San Carlos, CA (US); Alexander Jasso, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 2996 days.

(21) Appl. No.: 10/916,726

(22) Filed: Aug. 11, 2004

(65) Prior Publication Data

US 2006/0033703 A1 Feb. 16, 2006

(51) Int. Cl.
*G09G 5/00* (2006.01)

(52) U.S. Cl.
USPC .......................................................... 345/156

(58) Field of Classification Search .................. 188/161, 188/267, 267.1, 267.2, 164; 345/156–184; 715/701, 702; 324/167
See application file for complete search history.

(56) References Cited

U.S. PATENT DOCUMENTS

| | | |
|---|---|---|
| 3,157,853 A | 11/1964 | Hirsch |
| 3,198,293 A | 8/1965 | Mathews |
| 3,220,121 A | 11/1965 | Cutler |
| 3,497,668 A | 2/1970 | Hirsch |
| 3,517,446 A | 6/1970 | Corlyon et al. |
| 3,795,150 A | 3/1974 | Eckhardt |
| 3,812,936 A | 5/1974 | Dane |
| 3,902,687 A | 9/1975 | Hightower |
| 3,903,614 A | 9/1975 | Diamond et al. |
| 4,160,508 A | 7/1979 | Salisbury, Jr. et al. |
| 4,175,650 A | 11/1979 | Miller |
| 4,206,837 A | 6/1980 | Brown et al. |
| 4,236,325 A | 12/1980 | Hall et al. |
| 4,262,240 A | 4/1981 | Arai |
| 4,296,851 A | 10/1981 | Pierce |
| 4,400,790 A | 8/1983 | Chambers et al. |
| 4,513,235 A | 4/1985 | Acklam et al. |
| 4,553,080 A | 11/1985 | Cannon et al. |
| 4,560,983 A | 12/1985 | Williams |
| 4,581,491 A | 4/1986 | Boothroyd |

(Continued)

FOREIGN PATENT DOCUMENTS

| | | |
|---|---|---|
| EP | 0111992 | 6/1984 |
| EP | 0349086 | 1/1990 |

(Continued)

OTHER PUBLICATIONS

U.S. Appl. No. 10/902,462, Olien.

(Continued)

*Primary Examiner* — Chanh Nguyen
*Assistant Examiner* — Pegeman Karimi
(74) *Attorney, Agent, or Firm* — Kilpatrick Townsend & Stockton LLP

(57) ABSTRACT

Systems and methods for providing controlled friction in a haptic feedback device are described. One described device comprises a magnetic target, a magnetic core configured to be in communication with the magnetic target to provide a haptic effect, and a partition. The partition may be configured to maintain a magnetic circuit air gap between the magnetic target and the magnetic core, and to provide friction between the magnetic target and the magnetic core. Such a device may include a processor in communication with the magnetic core for providing a haptic effect.

21 Claims, 5 Drawing Sheets

U.S. PATENT DOCUMENTS

| | | |
|---|---|---|
| 4,599,070 A | 7/1986 | Hladky et al. |
| 4,643,282 A | 2/1987 | Edl |
| 4,652,805 A | 3/1987 | Kohn |
| 4,706,294 A | 11/1987 | Ouchida |
| 4,708,656 A | 11/1987 | De Vries et al. |
| 4,713,007 A | 12/1987 | Alban |
| 4,718,529 A | 1/1988 | Kroeger et al. |
| 4,758,165 A | 7/1988 | Tieman et al. |
| 4,823,106 A | 4/1989 | Lovell |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,059,842 A | 10/1991 | Uehara |
| 5,078,152 A | 1/1992 | Bond |
| 5,086,296 A | 2/1992 | Clark |
| 5,116,051 A | 5/1992 | Moncrief et al. |
| 5,116,180 A | 5/1992 | Fung et al. |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Brimhall |
| 5,466,213 A | 11/1995 | Hogan |
| 5,492,312 A | 2/1996 | Carlson |
| 5,542,672 A | 8/1996 | Meredith |
| 5,547,382 A | 8/1996 | Yamasaki |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,591,082 A | 1/1997 | Jensen et al. |
| 5,665,946 A | 9/1997 | Nishijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Naimark et al. |
| 5,914,705 A | 6/1999 | Johnson et al. |
| 5,944,151 A | 8/1999 | Jakobs et al. |
| 6,002,184 A | 12/1999 | Delson et al. |
| 6,008,800 A | 12/1999 | Pryor |
| 6,087,829 A | 7/2000 | Jager |
| 6,100,476 A | 8/2000 | Adamietz et al. |
| 6,111,577 A | 8/2000 | Zilles et al. |
| 6,128,006 A | 10/2000 | Rosenberg et al. |
| 6,147,422 A | 11/2000 | Delson et al. |
| 6,154,201 A | 11/2000 | Levin et al. |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,833 B1 | 8/2001 | Rosenberg et al. |
| 6,271,834 B1 | 8/2001 | May et al. |
| 6,283,859 B1* | 9/2001 | Carlson et al. ................ 463/36 |
| 6,307,285 B1 | 10/2001 | Delson et al. |
| 6,315,088 B1 | 11/2001 | Gustin et al. |
| 6,337,678 B1 | 1/2002 | Fish |
| 6,348,772 B1 | 2/2002 | May |
| 6,373,465 B2 | 4/2002 | Jolly et al. |
| 6,394,239 B1 | 5/2002 | Carlson |
| 6,400,352 B1 | 6/2002 | Bruneau et al. |
| 6,420,806 B2 | 7/2002 | Wittig |
| 6,422,941 B1 | 7/2002 | Thorner et al. |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 6,854,573 B2 | 2/2005 | Jolly et al. |
| 6,864,620 B2 | 3/2005 | Takeuchi et al. |
| 2001/0052893 A1 | 12/2001 | Jolly et al. |
| 2002/0044132 A1* | 4/2002 | Fish ................................ 345/156 |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1* | 5/2003 | Kobayashi ..................... 345/156 |
| 2003/0184518 A1* | 10/2003 | Numata et al. ................. 345/156 |
| 2004/0032395 A1* | 2/2004 | Goldenberg et al. ......... 345/156 |
| 2004/0040800 A1 | 3/2004 | Anastas et al. |
| 2004/0206611 A1 | 10/2004 | Kobayashi |

FOREIGN PATENT DOCUMENTS

| | | |
|---|---|---|
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Adelstein, "A Virtual Environment System for the Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. on Haptic Interfaces for Virtual Envir. & Teleoperator Systs. (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System for Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) for Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by the Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment." 0-7803-1363-1/93 IEEE. pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

\* cited by examiner

SYSTEMS AND METHODS FOR PROVIDING FRICTION IN A HAPTIC FEEDBACK DEVICE

RELATED APPLICATIONS

This application relates to, and incorporates by reference herein, co-pending application Ser. No. 10/314,400, filed Dec. 8, 2002, entitled "System and Method for Providing Passive Haptic Feedback;" Ser. No. 10/902,462, now U.S. Pat. No. 7,198,137, filed Jul. 29, 2004, entitled "Systems and Methods for Providing Haptic Feedback with Position Sensing;" and Ser. No. 10/885,902, filed May 27, 2004, entitled "Products and Processes for Providing Haptic Feedback in Resistive Interface Devices."

FIELD OF THE INVENTION

The present invention generally relates to providing haptic feedback. The present invention more particularly relates to providing controlled friction in a haptic feedback device.

BACKGROUND

Electronic device manufacturers strive to produce a rich interface for users. Conventional devices utilize visual and auditory cues to provide feedback to a user. In some interface devices, kinesthetic, and/or vibrotactile feedback (such as active and resistive force feedback, vibration, texture, heat, etc.) may also be provided to the user, more generally known collectively as "haptic feedback." Haptic feedback can provide cues that enhance and simplify the user interface.

Haptic feedback devices may rely on a friction force to output a haptic effect to a user. Materials used in such a device may wear prematurely or unevenly as a result of friction between moving elements. The coefficient of friction between moving elements in such a device may change over time as a result of this wear. The performance of a resistive haptic feedback device may be altered by the wear caused by friction forces.

The performance of a magnetic circuit may vary inversely with the square of a magnetic circuit air gap. A magnetic circuit may also suffer from the effects of residual magnetization between magnetic elements if the magnetic circuit air gap is not large enough. In a device employing a magnetic brake haptic actuator, the magnetic circuit air gap may be important to the overall performance of the device.

Thus a need exists for providing controlled friction in a haptic feedback device.

SUMMARY

Embodiments of the present invention provide systems and methods for providing controlled friction in a haptic feedback device. One embodiment of the present invention comprises a magnetic target, a magnetic core configured to be in communication with the magnetic target, and a partition. The partition may be configured to maintain a magnetic circuit air gap between the magnetic target and the magnetic core, and to provide friction between the magnetic target and the magnetic core. In one such embodiment, when the magnetic core acts upon the magnetic target, the resulting friction between the magnetic target and the partition, between the magnetic core and the partition, and/or between a plurality of partitions may cause a resistance, which can be controlled to deliver haptic effects to a user of the device.

These embodiments are mentioned not to limit or define the invention, but to provide examples of embodiments of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for providing controlled friction in a haptic feedback device. A device may incorporate a variety of technologies for providing haptic feedback, including both active and resistive devices. Active haptic feedback devices, including, for example, devices incorporating motors, generally add energy to a system; resistive devices, such as devices incorporating brakes, generally remove energy from the system.

Active haptic actuators may utilize, for example, alternating current (AC) or direct current (DC) electric motors and/or generators. Resistive haptic actuators may utilize, for example, electromagnetic brakes, magnetic particle brakes, magnetorheologic or electrorheologic brakes, or magnetic (non-friction) brakes. Electromagnetic brakes utilize a magnetic core, a coil, and a magnetic target. When a current is applied to the coil, the magnetic core acts upon the magnetic target. Magnetic particle brakes utilize a powder comprising particles of a magnetic material. When a current is applied, the particles line up and cause a resistance. Rheologic fluid brakes utilize a fluid that changes viscosity when a current is applied. A magnetic brake generates a magnetic field, and when a piece of metal passes through the magnetic field, an anti-current is generated, causing a resistance to movement of the metal.

Embodiments of the present invention may utilize a variety of diamagnetic materials, including transition metal alloys, such as a hard chrome, a hard nickel, or a titanium nitride. Embodiments of the present invention may be utilized by a broad array of devices, comprising cell phones, personal digital assistants, cameras, camcorders, MP3 players, and other electronic devices.

Figure 1:
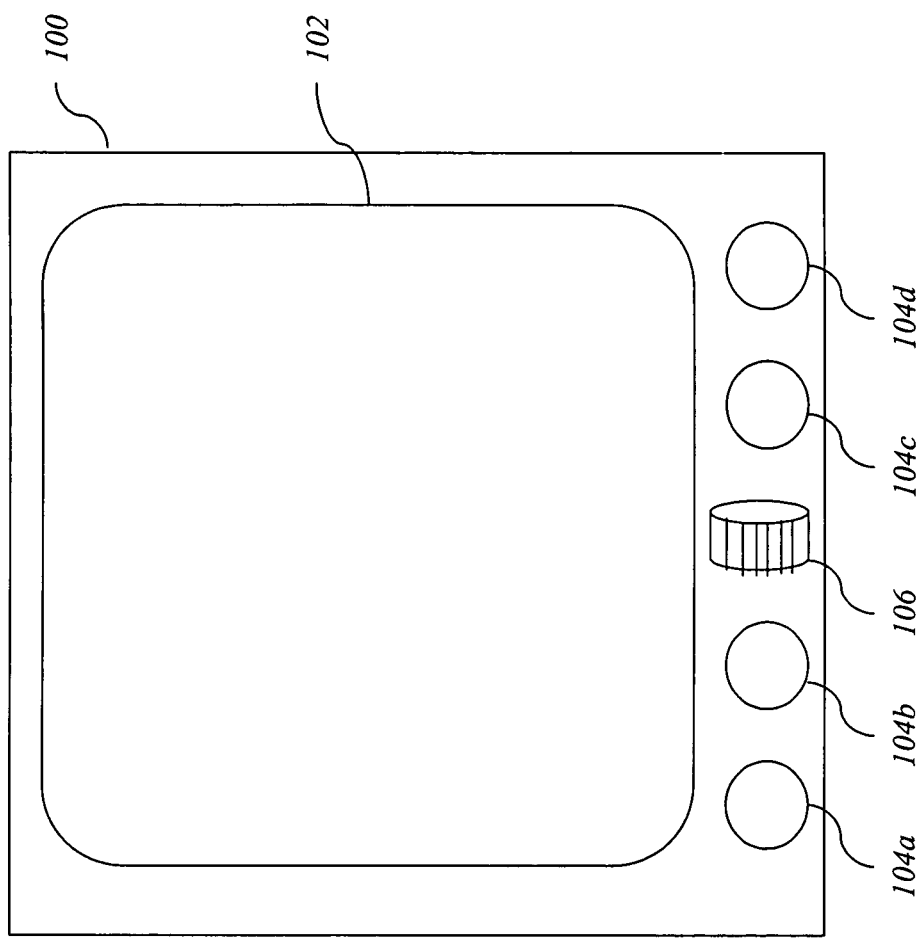
FIG. 1 illustrates a personal digital assistant incorporating one embodiment of the present invention.

Referring now to the drawings in which like numerals indicate like elements throughout the several figures, FIG. 1 illustrates a personal digital assistant incorporating one embodiment of the present invention. The personal digital assistant (PDA) 100 shown in FIG. 1 comprises a display screen 102 and several manipulanda, interface elements that a user of the PDA 100 can manipulate (in other embodiments, one manipulandum may be used). The manipulanda shown comprise a plurality of buttons 104a, 104b, 104c, 104d and a scroll wheel 106. In one embodiment, the user may utilize the buttons 104a-d to access specific applications, such as an address book. Once the user has accessed the address book application, the user may utilize the scroll wheel 106 to navigate through the various elements of the user interface, such as menus or a list of names contained in the electronic address book. The embodiment shown in FIG. 1 may provide haptic feedback to the scroll wheel 106 to enhance the user's interaction with the PDA 100. A device according to the present invention may provide haptic feedback in various physical mechanisms, such as the scroll wheel 106 shown in FIG. 1.

Figure 2:
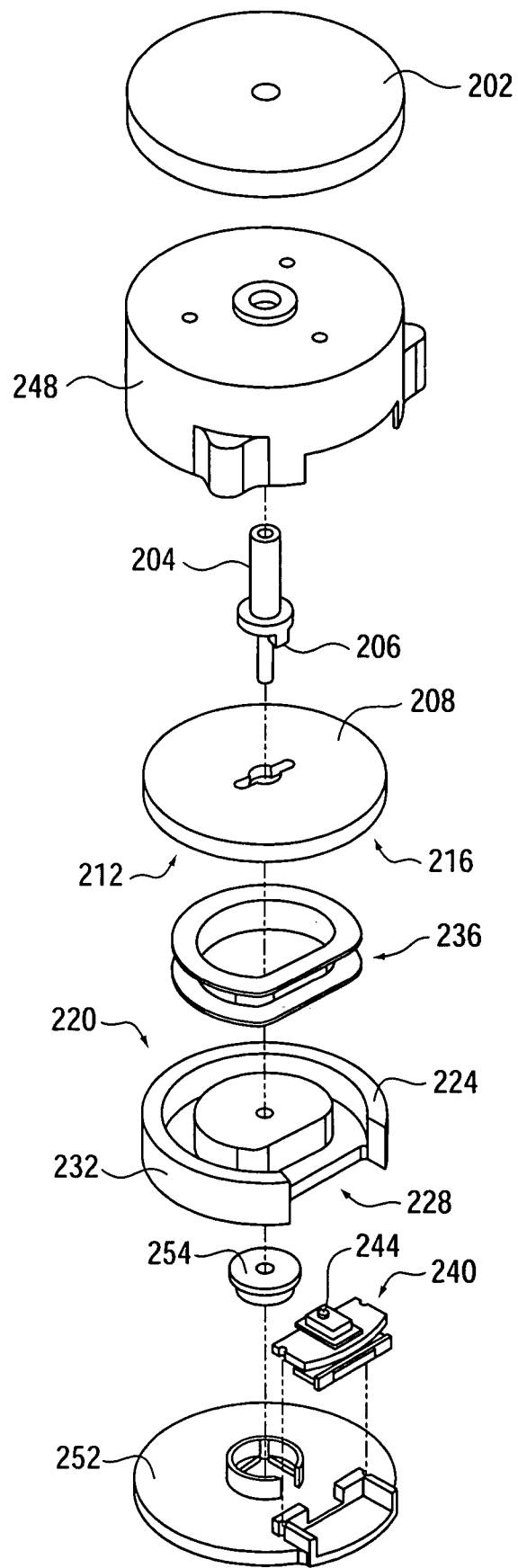
FIG. 2 is an exploded view of a device according to one embodiment of the present invention.

FIG. 2 is an exploded diagram of a manipulandum, a resistive haptic actuator, and a position sensor in one embodiment of the present invention. In the embodiment shown in FIG. 2, the manipulandum comprises a scroll wheel 202. The scroll wheel 202 may comprise, for example, the scroll wheel (106) shown in the PDA (100) of FIG. 1. In other embodiments, the manipulandum may comprise other forms, for example, a trackball, a joystick, a rocker switch, a button, or a knob.

At its center, the scroll wheel 202 shown is connected to a shaft 204. The scroll wheel 202 and shaft 204 rotate around a common axis. A magnetic target 208 in the form of a disk is fixably mounted on the shaft 204. The shaft 204 comprises a key 206. The magnetic target 208 is configured to receive the key 206 of the shaft 204. The magnetic target 208 rotates around the same common axis as the scroll wheel 202 and the shaft 204. Because the first brake surface 208 shown in FIG. 2 is fixably mounted on the shaft 204, the first brake surface 208 rotates with the scroll wheel 202.

The magnetic target 208 in the embodiment shown comprises a magnetic material, such as a steel disk. In other embodiments, the magnetic target 208 may comprise other magnetic materials, and may comprise other shapes, such as rectangular, triangular, or polygonal. The magnetic target 208 shown is not moveable towards the scroll wheel 202 axially along the shaft 204, nor is the magnetic target 208 free to rotate independently from the scroll wheel 202 and the shaft 204. In other embodiments, the magnetic target 208 may be free to move axially along the shaft 204, and/or may rotate independently of the scroll wheel 202 and/or the shaft 204. The magnetic target 208 comprises a coding 212 and a first partition 216, both of which are described in further detail with respect to FIG. 3.

Referring still to FIG. 2, an actuator 220 is shown. The actuator 220 shown comprises an electromagnetic brake. In other embodiments, the actuator 220 may comprise other types of brakes, such as magnetic particle, magnetorheologic, electrorheologic, magnetic, or piezo-electric brakes, and/or may comprise an active actuator, such as a DC motor. An actuator 220 according to the present invention may comprise other forms, such as a resistive slider device. The actuator 220 shown comprises a second partition 224, a magnetic core 232, and an electromagnetic coil 236. The actuator 220 in FIG. 2 is not free to rotate (although in other embodiments it may rotate). The actuator 220 may not move in the axial direction of the shaft 204. The second partition 224 is configured to contact the first partition 216 when the device 200 is assembled. In other embodiments, the actuator 220 may be free to move in the axial direction of the shaft 204.

In the embodiment shown, the second partition 224 comprises a broken ring around the top surface of the magnetic core 232. In other embodiments the second partition 224 may be separate from the actuator 220, and may comprise other shapes, such as a complete ring, a rectangle, a triangle, and a polygon. The second partition 224 shown is configured to contact the first partition 216 of the magnetic target 208. In other embodiments, the second partition 224 may be configured to separate from the first partition 216 when the actuator 220 is activated, or to contact the surface of the magnetic target 208 or the first partition 216 only when the actuator 220 is activated.

The second partition 224 shown is disposed on the magnetic core 232. In other embodiments, the second partition 224 may not be disposed on the magnetic core 232. For example, the second partition 224 may comprise a spacer unaffixed to either the magnetic target 208 or the magnetic core 232. In one such embodiment, the spacer may comprise a washer fabricated from a diamagnetic material.

The second partition 224 shown comprises a coating disposed on the magnetic core 232. The second partition 224 may be disposed on the magnetic core 232 using a variety of methods. For example, in one embodiment, the second partition 224 may be disposed on the magnetic core 232 by a vapor deposition process. Other methods for providing the second partition 224 may comprise bonding a substantially thin sheet of diamagnetic material to the magnetic core 232 using an epoxy or other adhesive substance; or riveting, tacking or spot-welding the diamagnetic material to the magnetic core 232.

The actuator 220 shown is configured to exert an attractive normal force on the magnetic target 208. The attractive normal force is configured to cause a friction force between the second partition 224 of the magnetic core 232 and the first partition 216 of the magnetic target 208. In other embodiments, the actuator 220 may be configured to bring the second partition 224 into contact with the surface of the magnetic target 208 or the first partition 216. In yet other embodiments, the actuator 220 may be configured to bring the magnetic target 208, and/or the first partition 216 into contact with the second partition 224. The magnetic core 232 shown comprises a substantially circular aperture of greater diameter than the shaft 204, which is located substantially centrally in surface of the substantially circular magnetic core 232. The shaft 204 passes through the aperture and is rotatably coupled to a housing base 252, as described below. The shaft 204 shown is constrained from moving in its axial direction, but is free to rotate. In other embodiments, the shaft 204 may be free to move in its axial direction.

The electromagnetic core 232 shown is configured to be in communication with the magnetic target 208. In the embodiment shown in FIG. 2, when the electromagnetic coil 236 shown receives a current, it provides a magnetic attractive force to the magnetic core 232. The electromagnetic core 232 may exert the magnetic attractive force on the magnetic target 208. The magnetic attractive force may cause the first and second partitions 216, 224 to contact each other with such a great normal force that there is a resistance to the movement of one with respect to the other. In other embodiments, the magnetic attractive force may move the second partition 224 of the magnetic core 232 axially along the shaft 208 into contact with the first partition 216 of the magnetic target 208. Contact between the first and second partitions 216, 224 may cause a resistance to movement of the scroll wheel 202. The resistance may cause the scroll wheel 202 to stop or may exert a force the user can overcome. In one embodiment, when the electromagnetic coil 236 receives a pulsed current, a haptic effect in the form of a vibration may be created. In another embodiment, a spring mounted between the magnetic target 208 and the magnetic core 232 of the actuator 220 may cause the two elements to separate when the electromagnetic coil 236 is not energized.

Embodiments of the present invention may utilize various other active and/or resistive actuators as well. For example, in one embodiment, an active actuator may provide resistive effects. In one such embodiment, a DC motor in communication with a manipulandum may be short-circuited or may act as a generator, causing a resistance to the turning of a drive shaft in communication with the motor. In an embodiment in which a motor is set up as a generator, the motor can generate current back to a power supply during certain resistive effects, such as braking effects and/or damping effects.

Other embodiments of the present invention may utilize a piezo-electric actuator. In a piezo-electric actuator, a voltage may be applied to a piezo-ceramic, causing the crystals to elongate and thereby changing the shape of the material. A change in shape of a piezo-ceramic material may be used to provide a mechanical force. In some embodiments, a material shape change of a piezo-ceramic may be relatively small and some type of amplification may be utilized to provide a mechanical force.

One embodiment of the present invention may comprise a controller (not shown), such as a processor, that may control the application of current generated by a power supply (not shown) to the electromagnetic coil 236 shown in FIG. 2. Processors can comprise, for example, digital logical processors capable of processing input, executing algorithms, and generating output as necessary to create the desired tactile sensations in the input device in response to the inputs received from that input device. Such controllers may comprise a microprocessor, an Application Specific Integrated Circuit (ASIC), and state machines.

Such processors comprise, or may be in communication with, media, for example computer-readable media, that may store instructions that, when executed by the processor, may cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein.

A controller according to the present invention may be capable of generating a variety of haptic effects. For example, the controller may create effects, such as detents, between entries in the address book application described with reference to FIG. 1. The controller may create additional effects as well, including, for example, bumps, vibrations and stops by applying various currents to the electromagnetic coil 236 shown in FIG. 2.

Some of the elements of the embodiment shown in FIG. 2 may be housed in a housing. In other embodiments, the device may be assembled without such a housing, or the housing may house greater or fewer of the device's elements. The housing shown comprises an upper housing portion 248, and a housing base 252. The upper housing portion 248 and the housing base 252 may be fashioned from a non-magnetic material, such as a plastic to avoid interference with the operation of the electromagnetic actuator 220. In other embodiments, the upper housing portion 248 and the housing base 252 may be fashioned from other materials, including a magnetic material. The housing base 252 may be fixably fastened to a surface, and/or mechanically grounded using any conventional method of fastening (such as adhesives, screws, and collet-pins).

The housing base 252 shown is configured to secure and prevent rotation of the upper housing portion 248, and to restrict the rotation of the actuator 220. In other embodiments, the housing base 252 may be configured to allow the rotation of the actuator 220. The housing base 252 shown is configured to receive a bronze bushing 254. The bronze bushing 254 is configured to receive the terminal point of the shaft 204. The bronze bushing 254 is further configured to permit the shaft 204 to rotate, and to constrain the movement of the shaft 204 axially. In one embodiment, a spring may be mounted between the bronze bushing 254 and the actuator 220 to keep the magnetic target 208 in contact with the actuator 220 unless the actuator 220 forces them apart.

Figure 3:
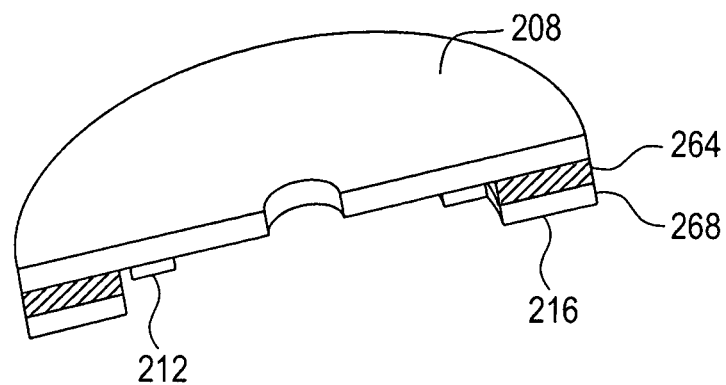
FIG. 3 is a cutaway view of a magnetic target according to one embodiment of the present invention.

Referring now to FIG. 3, a cutaway perspective view of the surface of the magnetic target 208 that faces the second partition 224 when the device shown in FIG. 2 is assembled is shown. The magnetic target 208 shown comprises the coding 212 and the first partition 216. In the embodiment shown in FIG. 3, the first partition 216 is configured to be the sole portion of the magnetic target 208 that contacts the second partition 224 when the magnetic core 232 of the actuator 220 acts upon the magnetic target 208. In other embodiments, other portions of the magnetic target 208 may be configured to contact the second partition 224 or the magnetic core 232.

The first partition 216 shown is disposed on the magnetic target 208. In other embodiments, the first partition 216 may not be disposed on the magnetic target 208. For example, the first partition 216 may comprise a spacer unaffixed to either the magnetic target 208 or the magnetic core 232. In one such embodiment, a spacer may comprise a washer fabricated from a diamagnetic material. The first partition 216 shown comprises a coating disposed on the magnetic target 208. The first partition 216 may be disposed on the magnetic target 208 using a variety of methods. For example, the first partition 216 may be disposed on the magnetic target 208 by a vapor deposition process. Other methods for disposing the first partition 216 on the magnetic target 208 comprise, for example, bonding a substantially thin layer of a diamagnetic material comprising the first partition 216 to the magnetic target 208 using an epoxy or other adhesive substance; or riveting, tacking, or spot-welding a diamagnetic material to the magnetic target 208.

The first partition 216 shown comprises a plurality of layers. In other embodiments, the first partition 216 may comprise a single layer of a diamagnetic material, such as a transition metal alloy. Examples of transition metal alloys comprise chromium alloys, nickel alloys, and titanium alloys. Each of the plurality of the layers comprising the first partition 216 shown comprises a transition metal alloy. In other embodiments where the first partition 216 comprises a plurality of layers, not all of the plurality of layers may comprise a diamagnetic material.

In the embodiment shown in FIG. 3, the layer shown adjacent the surface of the magnetic target 208 comprises a hard chrome layer 264. The hard chrome layer 264 comprises a chromium alloy. In other embodiments, the layer of diamagnetic material adjacent the surface of the magnetic target 208 may comprise a different chromium-based material, or any other diamagnetic material. The hard chrome layer 264 shown comprises a thickness of approximately 0.0003 inches. A titanium nitride layer 268 configured to contact the second partition 224 when the actuator 220 acts upon the magnetic target 208 is disposed on the hard chrome layer 264 of the first partition 216. The titanium nitride layer 268 shown comprises a thickness of approximately 0.0001 or fewer inches. In other embodiments, the first partition 216 may comprise a titanium nitride layer 268 adjacent the surface of the magnetic target 208. In yet other embodiments, the magnetic target 208 may not comprise a titanium nitride layer 268 or any first partition 216. In one such embodiment, the partition may comprise a second partition 224 affixed to the magnetic core 232 similar to the one described herein with respect to FIGS. 2-4. In another such embodiment, the partition may comprise a spacer, such as a washer, fabricated from a diamagnetic material and unaffixed to either the magnetic target 208 or the magnetic core 232.

The coding 212 in the embodiment shown comprises a ring of markings printed on the magnetic target 208. The coding 212 may comprise, for example, a series of light and dark markings capable of being distinguished by an optical sensor. In other embodiments, the coding 212 may comprise other types and configurations, such as one or more symbols, markings, etchings, holes, depressions, material additions, magnetized strips, or any other type of identifier that may help convey the relative movement or location of the magnetic target 208, and/or the relative movement or location of the actuator 220. The coding 212 may be provided using a variety of different processes. For example, the coding 212 may be deposited on, drawn on, ground into, melted into, or affixed to the magnetic target 208.

Figure 4:
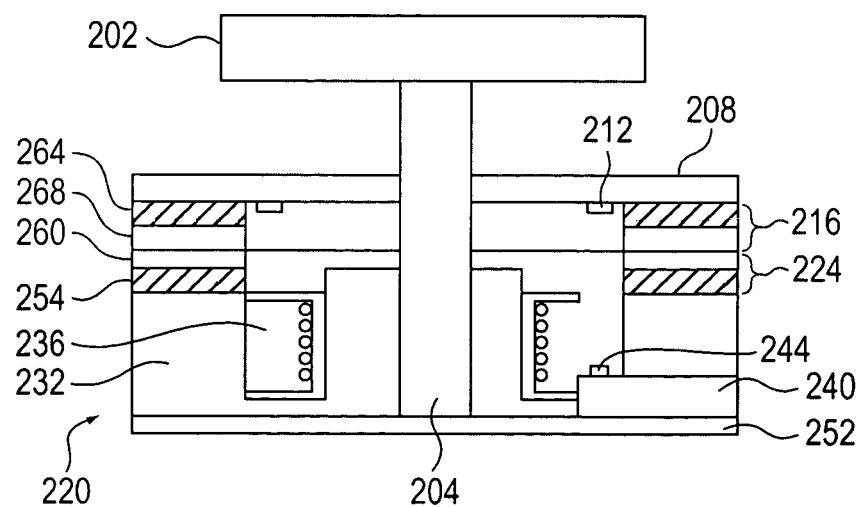
FIG. 4 is a cutaway view of an electromagnetic brake haptic device according to one embodiment of the present invention.

The coding 212 in the embodiment shown in FIG. 3 comprises information from which a sensing device 240 (as shown in FIGS. 2 and 4) may be capable of sensing, for example, the relative movement between the magnetic target 208 and the sensing device 240. In another embodiment, the sensing device may be capable of sensing a relative movement between the magnetic target 208 and the actuator 220, and/or the relative movement between the actuator 220 and the sensing device 240. In one such embodiment, the sensing device 240 may be attached to the actuator 220.

The sensing device 240 may communicate to the processor device the relative movement between the magnetic target 208 and the sensing device 240 in a sensor output signal. From the sensor output signal, the processor device may be able to ascertain, for example, the position of the scroll wheel 202 in rotational communication with the magnetic target 208. For example, the scroll wheel 202 may rotate with the magnetic target 208. The processor device may be in communication with an I/O port connected to a power supply (not shown). In response to receiving the sensor output signal from the sensing device 240, the processor device may send a feedback control signal in the form of an electrical current generated by the power supply to the electromagnetic coil 236 to create a desired haptic effect.

Referring now to FIG. 4, the illustrative device of FIGS. 2 and 3 is shown assembled in an elevation view. The second partition 224 coating shown comprises a plurality of layers. In other embodiments, the second partition 224 may comprise a single layer of a diamagnetic material, such as a transition metal alloy. Yet other embodiments may not include a second partition 224 at all. In one such embodiment, the partition of a device may comprise a first partition 216 as described herein with respect to FIGS. 2-4. In another such embodiment, the partition of a device may comprise a spacer, such as a washer, composed of a diamagnetic material, unaffixed to either the magnetic target 208 or the magnetic core 232.

Each of the plurality of the layers comprising the second partition 224 shown comprises a transition metal alloy. Examples of transition metal alloys include chromium alloys, nickel alloys, and titanium alloys. The layer shown adjacent the surface of the magnetic core 232 comprises a hard chrome layer 254. The hard chrome layer 254 shown comprises a chromium alloy, but in other embodiments may comprise chromium, or another chromium-based material. The hard chrome layer 254 shown comprises a thickness of approximately 0.0003 inches. A titanium nitride layer 260 configured to contact the first partition 216 is disposed upon the hard chrome layer 254 of the second partition 224. The titanium nitride layer 260 shown comprises a thickness of approximately 0.0001 inches. In other embodiments, the second partition 224 may comprise a titanium nitride layer 260 adjacent the surface of the magnetic core 232. In yet other embodiments, the magnetic core 232 may not comprise the second partition 224.

FIG. 4 shows the device in a state in which the actuator 220 has been actuated. The electromagnetic coil 236 has received an electrical current, causing the magnetic core 236 to communicate with the magnetic target 208 by acting upon it with a magnetic attractive force. The second partition 224 is in contact with the first partition 216. The titanium nitride layer 268 of the first partition 216 shown is in contact with the titanium nitride layer 260 of the second partition 224. The kinetic coefficient of friction between the titanium nitride layers 268, 260 of the first and second partitions 216, 224 comprises a value of greater than or approximately equal to 0.12. Other embodiments may utilize a wide variety of diamagnetic materials and partition configurations to provide friction between the magnetic target 208 and the magnetic core 232. For example, in one embodiment a partition (or partitions) may be fashioned from one or more of a plurality of diamagnetic or non-magnetic materials to provide different predetermined values and/or ranges of coefficients of static and/or kinetic friction between the magnetic target 208 and the magnetic core 232.

In addition to providing friction between the magnetic target 208 and the magnetic core 232, a partition may maintain a magnetic circuit air gap between these elements. For example, in one embodiment, the partition may maintain a substantially constant magnetic circuit air gap between the magnetic target 208 and the magnetic core 232. The performance of a magnetic circuit, such as an electromagnetic brake, may vary inversely in proportion to the magnetic circuit's magnetic circuit air gap squared. As the magnetic circuit air gap increases, the circuit's performance may drop substantially. In the case of an electromagnetic brake actuator, such as the actuator 220 shown in FIGS. 2-4, the larger the magnetic circuit air gap, the lesser the force with which the actuator 220 may push the magnetic core 232 into the magnetic target 208. In this regard, efforts are made to make the magnetic circuit air gap as small as the device design will allow.

However, electromagnetic brake haptic actuators may suffer from residual magnetization effects if the magnetic circuit air gap is too small. Residual magnetization in an electromagnetic brake actuator may result in residual power-off friction between the magnetic target 208 and the magnetic core 232. The residual power-off friction in the actuator 220 may prevent a device, such as the device described with respect to FIGS. 2-4, from providing a variety of haptic effects to a user. The residual power-off friction in the actuator 220 may also decrease the responsiveness of the device, possibly limiting its usefulness. The introduction of a controlled electromagnetic circuit air gap to an electromagnetic circuit may help minimize the residual magnetization effects, while still providing the magnetic core 232 of the actuator 220 with the ability to effectively communicate with the magnetic target 208. Accordingly, in one embodiment, the first step in designing an electromagnetic circuit comprising a partition may comprise determining what partition thickness comprising the magnetic circuit air gap will best balance these competing factors.

The distance between the surface of the magnetic target 208 and the surface of the magnetic core 232 that exists when, as shown, the first and second partitions 216, 224 are in contact comprises a magnetic circuit air gap. The magnetic circuit air gap shown comprises a gap thickness of approximately 0.001 to 0.002 inches. The gap thickness of approximately 0.001 to 0.002 inches comprises the total thickness of both the first and the second partitions 216, 224, plus a region of low-permeability material (such as air) around and adjacent to the shaft 204.

In the embodiment shown, the total thickness of both the first and second partitions 216, 224 comprises the approximately 0.0003 inch thick hard chrome layer 264 of the first partition 216, the approximately 0.0001 inch thick titanium nitride layer 268 of the first partition 216, the approximately 0.0001 inch thick titanium nitride layer 260 of the second partition 224, and the approximately 0.0003 inch thick hard chrome layer 254 of the second partition 224, plus the region of low-permeability material around and adjacent to the shaft 204. As such, the partitions 216, 224 maintain a substantially constant magnetic circuit air gap between the magnetic target 208 and the magnetic core 232 while providing friction between the magnetic target 208 and the magnetic core 232.

In another embodiment, the partition may comprise a spacer, such as a washer, unaffixed to either the magnetic target or the magnetic core. The thickness of the spacer partition in such an embodiment may comprise the magnetic circuit air gap thickness of a device employing its use. In such an embodiment, friction between the magnetic target 208 and the magnetic core 232 may be based, at least in part on friction between the magnetic target 208 and the spacer partition, and/or friction between the magnetic core 232 and the spacer partition. For example, in one such embodiment, an effective coefficient of friction between the magnetic target 208 and the magnetic core 232 may comprise the sum of the coefficients of friction between the magnetic target 208 and the spacer partition, and between the magnetic core 232 and the spacer partition.

Another step in designing an electromagnetic circuit comprising a partition may comprise choosing a material from which to fabricate a partition or partitions. The ability of an actuator to provide friction between the magnetic target 208 and the magnetic core 232 may be partly a function of the material from which the partition(s) is fabricated. For example, in the embodiment shown in FIGS. 2-4, the friction provided by the first and second partitions 216, 224 is partly a function of the diamagnetic materials from which they are fashioned.

When an actuator 220 comprising the ability to force the magnetic core 232 and the magnetic target 208 together with a substantially large normal force is utilized in a device according to the present invention, a lesser coefficient of static and/or kinetic friction between the magnetic core 232 and the magnetic target 208 may be required to provide the same haptic effects as a device comprising an actuator 220 comprising a lesser ability to force the magnetic core 232 and the magnetic target 208 together. Accordingly, engineers and product designers may choose to fashion a partition or partitions from a diamagnetic material or combination of diamagnetic materials that will provide the desired coefficient of static and/or kinetic friction between the magnetic core 232 and the magnetic target 208 based, in part, on the ability of the actuator 220 utilized in the device to force the magnetic core 232 towards the magnetic target 208.

A designer of a haptic actuator may further balance a prospective diamagnetic material's ability to provide an adequate amount of friction between the magnetic target 208 and the magnetic core 232, with its ability to provide an acceptable wear characteristic to prevent premature wear of the device employing the partition. However, devices comprising an electromagnetic brake actuator may suffer from premature wear of the braking surfaces if no measure is taken to prevent the premature wear by protecting the surfaces of the magnetic target 208 and the magnetic core 232. Similarly, a device that may protect the surfaces of the magnetic target 208 and the magnetic brake 232 through the use of a partition or partitions, such as the device described herein with respect to FIGS. 2-4, may suffer from premature wear if the diamagnetic materials from which the partitions 216, 224 are fashioned do not comprise an appropriate wear characteristic.

For example, one factor that may be used to select the materials from which the first and second partitions 216, 224 may be fabricated from is the wear characteristic they provide the device. The materials comprising the first and second partitions 216, 224 shown were chosen, in part, based on their ability to provide kinetic friction comprising a coefficient of friction of greater than or approximately equal to 0.12, while maintaining the substantially constant magnetic circuit air gap of gap thickness of approximately 0.001 to 0.002 inches between the magnetic target 208 and the magnetic core 232.

The designer of a device according to the present invention may balance the wear characteristic of the materials under consideration for the partition or partitions with the coefficient of static and/or kinetic friction they may provide between the magnetic target 208 and the magnetic core 232. In addition, a partition may be subject to other wear-related issues, such as pitting, warping or cracking. A device designer may select a diamagnetic material from which to fashion the partition based, in part, on these concerns. The wear characteristic of a partition may be based, at least in part, on changes in the surface interaction between moving parts, and may not be a linear change in some embodiments. A change in a coefficient of static and/or kinetic friction provided between the magnetic target 208 and the magnetic core 232, and/or in the amount of particulation of a material's surface may determine if a surface becomes unacceptable. A change in a coefficient of static and/or kinetic friction, and/or a particulation rate may be limited to localized areas, and may spread from these localized areas. A wear characteristic can, in some embodiments, depend on force levels, rotation speed, as well as the number of rotations a device has performed.

Referring again to FIG. 4, the sensing device 240 shown is housed in the housing base 252. The sensing device 240 comprises a sensor 244 capable of sensing the coding 212 of the magnetic target 208. The sensor 244 may comprise, for example, an optical sensor capable of sensing light and dark markings, such as the series of markings comprising the coding 212. In other embodiments, the coding 212 may comprise other configurations, including a marking, an etching, a hole, a depression, a material addition, a magnetized strip, or any other type of coding that may help convey the relative movement or location of the magnetic target 208 and/or the scroll wheel 202.

The sensor 244 of the sensing device 240 in the embodiment shown is located substantially beneath a visible portion of the coding 212 that appears as the magnetic target 208 rotates, exposing a portion of the coding to the sensor 244. The sensor 244 of the sensing device 240 has an unobstructed line of sight to the exposed portion of the coding 212 on the magnetic target 208. In other embodiments the sensor 244 may not require an unobstructed line of sight to the coding 212. For example, in one such embodiment, the coding 212 may comprise magnetic information, and the sensing device 240 may comprise a sensor 244 configured to sense the magnetic coding 212 through an obstruction.

Various methods and devices utilizing the present invention may be employed. For example, in one embodiment of the present invention, a device may comprise a magnetic target, a magnetic core configured to be in communication with the magnetic target to provide a haptic effect, and a partition. The magnetic core may comprise, for example, an electromagnet, and may be fashioned from a magnetic material. The partition may maintain a magnetic circuit air gap between the magnetic target and the magnetic core. For example, in one embodiment, the partition may maintain a substantially constant magnetic circuit air gap between the magnetic target and the magnetic core. The partition may be interposed between the magnetic target and the magnetic core.

The partition may further provide friction between the magnetic target and the magnetic core. The friction between the magnetic target and the magnetic core may comprise a resistance to movement between the magnetic target and the magnetic core. In one embodiment, the partition may provide a predetermined amount of friction between the magnetic target and the magnetic core, and/or a predetermined coefficient of static and/or kinetic friction (or a predetermined range thereof) in an interface. For example, in one embodiment, the friction between the magnetic target and the magnetic core by the partition may comprise at least one of a coefficient of static friction range and a coefficient of kinetic friction range. In one embodiment, the partition may be configured to exhibit a wear characteristic between the magnetic target and the magnetic core. The wear characteristic may comprise, for example, a predetermined wear characteristic.

The partition may be disposed upon at least one of the magnetic target and the magnetic core. For example, in one embodiment, the partition may comprise a coating on one or both of the magnetic target and the magnetic core. In one embodiment, a partition may comprise a plurality of layers. For example, a partition may comprise multiple coatings, wherein each of the coatings comprises a different material, and is disposed upon one or both of the magnetic target and the magnetic core.

In another embodiment, the partition may comprise a spacer. A spacer may comprise an element, for example, unattached to either the magnetic target or the magnetic core. An example of a spacer comprises a substantially cylindrical washer fabricated from a diamagnetic material.

A partition may be fashioned from a variety of different materials. For example, in one embodiment, a partition may comprise a non-magnetic material, such as aluminum, and/or a non-metallic material, such as a polymer, a rubber, a wood, or a glass. In one embodiment a partition may comprise a diamagnetic material. One class of diamagnetic material that may be used to fashion the partition comprises transition metal alloys. Transition metal alloys include alloyed materials from the transitional metals area of the periodic table. Examples of transition metal alloys comprise hard chromes, such as chromium and chromium alloys; hard nickels, such as nickel and nickel alloys; and titanium alloys, such as titanium nitride.

The present invention may further be embodied in a system comprising an actuator and a manipulandum. The actuator may comprise a partition configured to maintain a magnetic circuit air gap between a magnetic target and a magnetic core. In one embodiment the partition may maintain a substantially constant magnetic circuit air gap between the magnetic target and the magnetic core. The partition may alternatively or additionally provide friction between the magnetic target and the magnetic core. The friction between the magnetic target and the magnetic core may comprise a predetermined coefficient of static and/or kinetic friction, or a range thereof.

The manipulandum in such a system may be in communication with at least one of the magnetic target and the magnetic core. A system according to the present invention may further comprise a sensing device in communication with at least one of the magnetic core, the magnetic target, and the manipulandum. One such system comprises a processor in communication with the actuator.

The present invention may further be embodied in a method. One illustrative method embodiment may comprise identifying a magnetic circuit air gap between a magnetic core and a magnetic target, identifying at least one of a coefficient of static friction (or range thereof) and a coefficient of kinetic friction (or range thereof) between the magnetic core and the magnetic target, and determining a partition configuration that will maintain the magnetic circuit air gap and any identified coefficient(s) of friction, and/or ranges of coefficient(s) of friction. One such method may further comprise identifying a wear characteristic between the magnetic core and the magnetic target. In one such method, the partition configuration may provide the wear characteristic between the magnetic target and the magnetic core.

One embodiment may comprise interposing a partition comprising the determined partition configuration between the magnetic core and the magnetic target. In one such embodiment, the partition may be configured to maintain the magnetic circuit air gap and to provide a predetermined coefficient of static and/or kinetic friction between the magnetic target and the magnetic core. The partition may further provide the wear characteristic between the magnetic core and the magnetic target.

Figure 5:
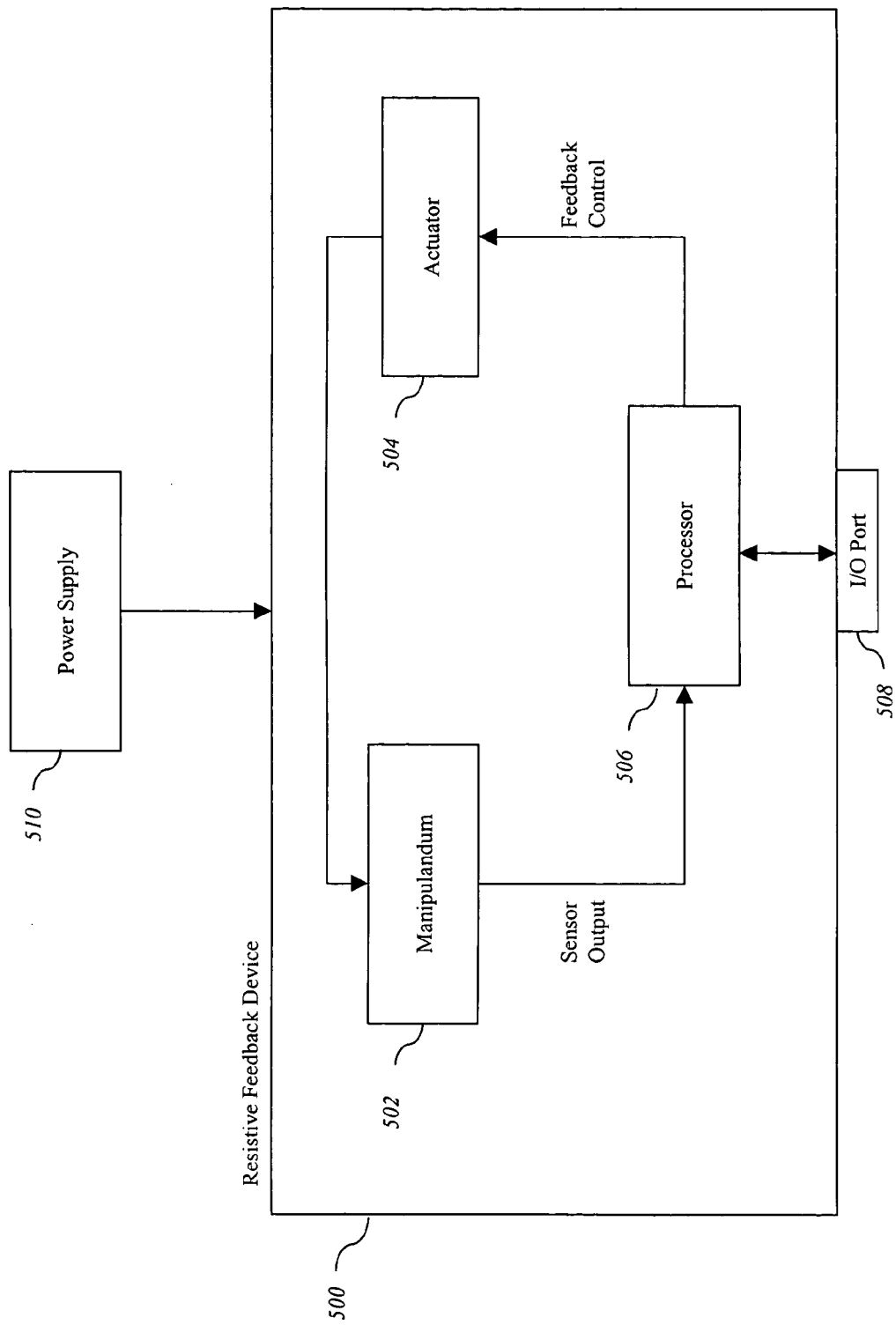
FIG. 5 is a block diagram, illustrating one embodiment of a resistive feedback device according to the present invention.

FIG. 5 is a block diagram, illustrating one embodiment of a resistive feedback device according to the present invention. In the embodiment shown, the resistive feedback device 500 comprises a manipulandum 502. The manipulandum 502 may comprise one of the manipulanda discussed in relation to FIGS. 1-4 or various other types of manipulanda. The device 500 also comprises an actuator 504, such as an electromagnetic brake. The electromagnetic brake may comprise a device similar to the one discussed in relation to FIGS. 1-4. The manipulandum 502 and actuator 504 shown are both in communication with a processor 506. The processor 506 may be similar to the processor discussed in relation to FIGS. 1-4. The processor 506 may receive sensor information from the manipulandum 502, perform control algorithms, and provide feedback control signals to the actuator 504.

The device 500 shown in FIG. 5 further comprises an input/output (I/O) port 508, such as a game port, for performing bi-directional communication with external devices utilizing an embodiment of the present invention. In the embodiment shown, the device 500 receives power from an external power supply 510. In other embodiments, power may be supplied through the I/O port 508 or by utilizing an internal power supply. Various embodiments may utilize additional components as well, such as an amplifier to amplify signals to the actuator.

Figure 6:
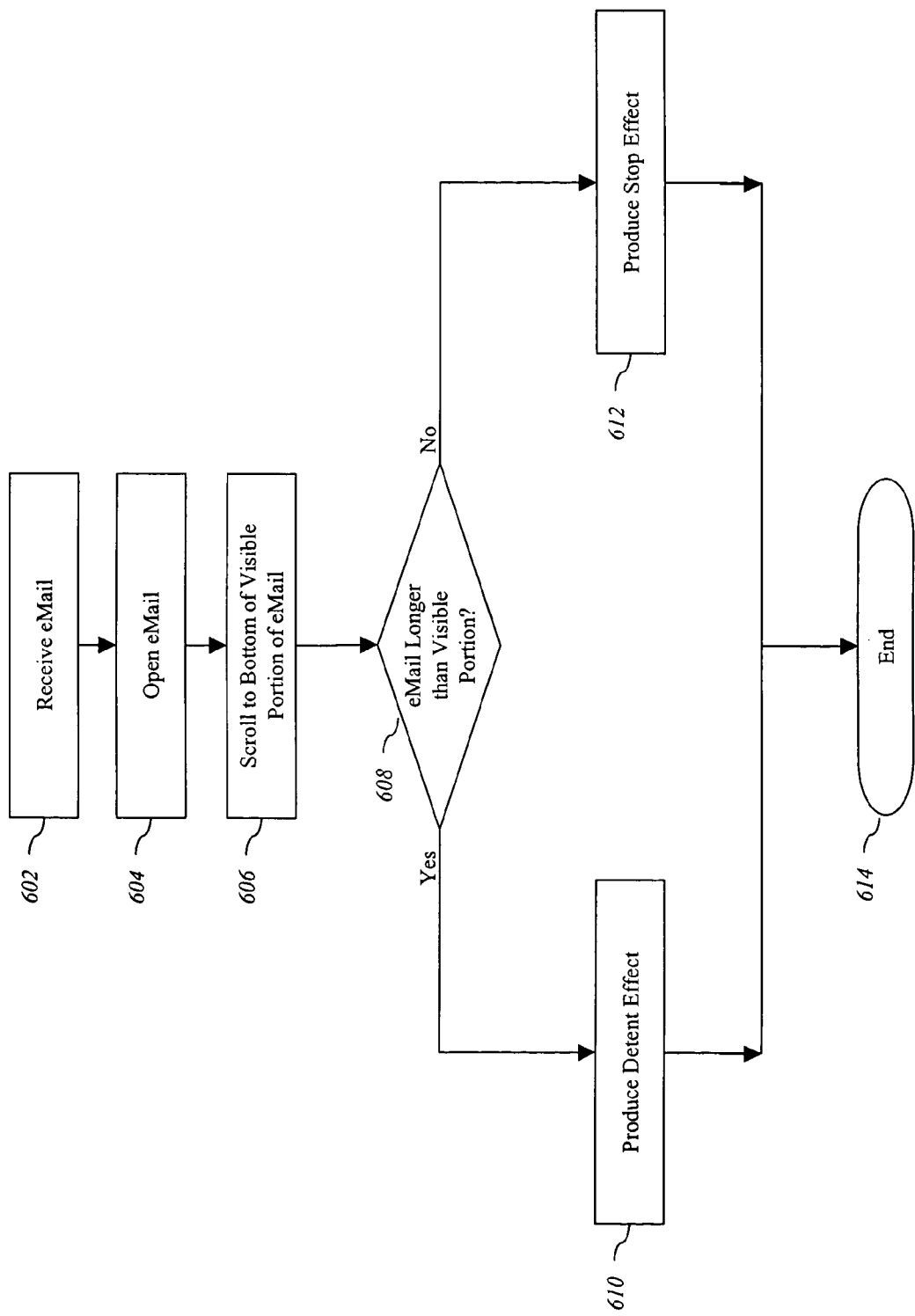
FIG. 6 is a flowchart, illustrating a process of navigating email on a personal digital assistant (PDA) utilizing an embodiment of the present invention.

FIG. 6 is a flowchart illustrating a process of navigating email on a personal digital assistant (PDA) utilizing an embodiment of the present invention. The method illustrated in FIG. 6 is described with reference to PDA (100) shown in FIG. 1. The PDA (100) comprises a scroll wheel (106). For example, the scroll wheel (106) may comprise the scroll wheel of FIGS. 2-4 (202).

As shown in box 602, the user of the PDA (100) receives an email. The user may then utilize an interface device, such as a button (104), to open the email, as shown in box 604. Using the scroll wheel (106), the user then scrolls to the bottom of the email displayed on the PDA screen (102) as shown in box 606 by turning the scroll wheel (106). A sensor (244) of a sensing device (240) may sense a coding (212) on a magnetic target (208) in communication with the scroll wheel (106) as described with respect to FIGS. 2-4 when the user turns the scroll wheel (106). From the coding (212), the sensing device (240) may be able to ascertain a relative movement of the magnetic target (208) with respect to the sensing device (240), and therefrom the position of the scroll wheel (106). The sensing device (240) may send the sensed information in a sensing device output signal to a processor.

The PDA screen (102) may or may not be large enough to display the received email. If the email is longer than the visible portion of the screen (102) as shown in box 608, the processor that received the sensing device output signal may communicate with an actuator (220) as described with respect to FIGS. 2-4 by sending a feedback control signal. The feedback control signal may comprise an electric current supplied by a power supply to the actuator (220). The electromagnetic coil (236) of the actuator (220) may receive the feedback control signal sent by the processor, and may cause a detent effect on the scroll wheel (106) by turning the electromagnetic core (232) into an electromagnet and thereby forcing the first and second partitions (216, 224) towards each other with a substantially normal force.

The contact of the first and second partitions (216, 224) may create a resistance to the movement of the scroll wheel (106) in communication with the first partition (216) over a short interval of time as shown in box 610. The user can overcome the resistive haptic effect by continuing to scroll the scroll wheel (106) down through the email. The effect may provide an indicator to the user that he or she is scrolling beyond the visible portion of the email message.

Referring still to FIG. 6, if the email is not longer than the visible portion of the screen (102), the processor may send a different feedback control signal to the actuator (220), such as by supplying a stronger electric current to the electromagnetic coil (236), causing the first and second partitions (216, 224) to contact each other with such a great normal force that the magnetic target (208) cannot substantially be moved with respect to the actuator (220). This contact may cause a stop effect in the PDA device (100), comprising a strong resistance to further movement of the scroll wheel (106) by the user as shown in box 612. Once the effect has been provided, the process may end, as shown in box 614.

Various other types of effects may be utilized. For example, in one embodiment, the actuator may provide a "bump" when the end of the email is reached. If the user continues to scroll past the bump, the application may display the next email in the folder the user is currently viewing.

Embodiments of the present invention may be incorporated into a broad array of devices. For example, an instrument control interface in an automobile may utilize rotary control knobs comprising electromagnetic brake haptic actuators according to the present invention. A television remote control may also incorporate an embodiment of the present invention for channel navigation, volume control, and other related functions. Similarly, an audio component remote control may utilize an embodiment for volume control or other audio control. A laptop computer may utilize an embodiment for navigation, volume control, or any other function utilizing a scroll wheel, scroll drum, linear slider, or similar user interface device. PDA's, handheld navigation, and handheld email appliances may also benefit from utilizing an embodiment of the present invention.

A camera may utilize an embodiment of the present invention for user control of the focus, f-stop, menu navigation, and other camera-related functions. Since the effects provided by the actuator may be programmable, one manipulandum may be utilized to perform many or all of the functions on the camera. A video recorder may utilize an embodiment of the present invention to provide functions such as shuttle, fast forward, and reverse. An actuator may create detents on a frame-by-frame basis for the shuttle function, and hard stops for fast forward and reverse.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A device comprising:
   a magnetic target;
   a magnetic core configured to be in communication with the magnetic target to provide a haptic effect; and
   a partition configured to maintain a magnetic circuit air gap between the magnetic target and the magnetic core and to provide friction between the magnetic target and the magnetic core.

2. The device of claim 1, wherein the magnetic circuit air gap comprises a substantially constant magnetic circuit air gap.

3. The device of claim 1, wherein the friction between the magnetic target and the magnetic core comprises a resistance to movement between the magnetic target and the magnetic core.

4. The device of claim 1, wherein the friction between the magnetic target and the magnetic core comprises at least one of a predetermined coefficient of static friction range and a predetermined coefficient of kinetic friction range.

5. The device of claim 1, wherein the partition is further configured to exhibit a wear characteristic between the magnetic target and the magnetic core.

6. The device of claim 1, wherein the partition is interposed between the magnetic target and the magnetic core.

7. The device of claim 1, wherein the partition is disposed upon at least one of the magnetic target and the magnetic core.

8. The device of claim 1, wherein the partition comprises a coating.

9. The device of claim 1, wherein the partition comprises a plurality of layers.

10. The device of claim 1, wherein the partition comprises a spacer.

11. The device of claim 1, wherein the partition comprises at least one of a diamagnetic partition and a non-magnetic partition.

12. The device of claim 1, wherein the partition comprises a transition metal alloy.

13. The device of claim 1, wherein the partition comprises a non-metallic material.

14. The device of claim 1, wherein the magnetic core comprises an electromagnet.

15. A method comprising:
providing a magnetic target;
providing a magnetic core configured to be in communication with the magnetic target to provide a haptic effect; and
providing a partition configured to maintain a magnetic circuit air gap between the magnetic target and the magnetic core and to provide friction between the magnetic target and the magnetic core.

16. The method of claim 15, wherein the magnetic circuit air gap comprises a substantially constant magnetic circuit air gap.

17. The method of claim 15, further comprising interposing the partition between the magnetic target and the magnetic core.

18. The method of claim 17, wherein the magnetic circuit air gap comprises a substantially constant magnetic circuit air gap.

19. The method of claim 17, further comprising identifying a wear characteristic between the magnetic core and the magnetic target.

20. The method of claim 17, further comprising interposing a partition comprising the partition configuration between the magnetic core and the magnetic target.

21. The method of claim 15, further comprising disposing the partition upon at least one of the magnetic target and the magnetic core.

* * * * *